United States Patent
Chen et al.

(10) Patent No.: US 11,878,288 B2
(45) Date of Patent: Jan. 23, 2024

(54) ISOPOLY-MOLYBDIC ACID COORDINATION POLYMER CATALYST, METHOD OF MANUFACTURING THE SAME AND APPLICATION THEREOF

(71) Applicant: Changzhou University, Changzhou (CN)

(72) Inventors: Shengchun Chen, Changzhou (CN); Qitao Zhang, Changzhou (CN); Qun Chen, Changzhou (CN); Junfeng Qian, Changzhou (CN); Mingyang He, Changzhou (CN); Meijun Wei, Changzhou (CN)

(73) Assignee: Changzhou University, Changzhou (CN)

( * ) Notice: Subject to any disclaimer, the term of this patent is extended or adjusted under 35 U.S.C. 154(b) by 3 days.

(21) Appl. No.: 17/872,021

(22) Filed: Jul. 25, 2022

(65) Prior Publication Data
US 2023/0173469 A1  Jun. 8, 2023

(30) Foreign Application Priority Data
Dec. 3, 2021 (CN) .......................... 202111475222.5

(51) Int. Cl.
*B01J 23/88* (2006.01)
*B01J 37/04* (2006.01)
(Continued)

(52) U.S. Cl.
CPC .............. *B01J 23/88* (2013.01); *B01J 37/04* (2013.01); *B01J 37/08* (2013.01); *C08G 63/823* (2013.01)

(58) Field of Classification Search
CPC ...... B01J 23/88; B01J 23/885; B01J 31/0244; B01J 31/1691; B01J 31/181; B01J 37/04; B01J 37/08; C08G 63/823
(Continued)

(56) References Cited

U.S. PATENT DOCUMENTS

2003/0144550 A1* 7/2003 Davis .................... C07C 51/215
562/545
2012/0270138 A1* 10/2012 Koshino ................. H01M 4/90
429/485
(Continued)

FOREIGN PATENT DOCUMENTS

CN  103990493 A  *  8/2014
CN  104262364 A  *  1/2015
(Continued)

OTHER PUBLICATIONS

Wayne Ouellette et al., "Solid-State Coordination Chemistry of the Cu/Triazolate/X System (X = F-, Cl-, Br-, I-, OH-, and SO42-)." Inorganich Chemistry, 45, pp. 9346-9366. (Year: 2006).*

Nure Alam, et al., "[Cu(min)4]2[a-Mo8O26]—A layer-type octamolybdate framework." Solid State Sciences 12, pp. 471-475. (Year: 2010).*

Mark Bartholomä et al., Inorganic Chemistry Communications 14, pp. 107-110. (Year: 2011).*
(Continued)

*Primary Examiner* — Patricia L. Hailey
(74) *Attorney, Agent, or Firm* — Idea Intellectual Limited; Margaret A. Burke; Sam T. Yip

(57) ABSTRACT

An isopoly-molybdic acid coordination polymer catalyst for manufacturing polycaprolactone and method of manufacturing the same are provided. It relates to a field of catalysts from polycaprolactone. The chemical formula of the isopoly-molybdic acid coordination polymer catalyst is $[Cu_2(trz)_2(\gamma\text{-}Mo_8O_{26})_{0.5}(H_2O)_2]$. In the chemical formula, trz is 1,2,4-triazole negative monovalent anion, and $[\gamma\text{-}Mo_8O_{26}]$ is a γ type octamolybdate anion. This synthesis method offers higher yield with strong reproducibility. The resulting crystal products have higher purity. The isopoly-molybdic acid coordination polymer catalyst shows high catalytic activity
(Continued)

towards the bulk ring-opening polymerization of caprolactone. The resulting polycaprolactone has a weight average molecular weight exceeding 50,000 and a narrow molecular distribution. The polycaprolactone has great potential in the application of low- to medium-temperature thermoplastic medical materials.

10 Claims, 3 Drawing Sheets

(51) Int. Cl.
    *B01J 37/08*     (2006.01)
    *C08G 63/82*     (2006.01)

(58) Field of Classification Search
    USPC .......................................... 502/165, 318, 321
    See application file for complete search history.

(56) References Cited

U.S. PATENT DOCUMENTS

| | | | | |
|---|---|---|---|---|
| 2023/0158477 A1* | 5/2023 | He | ........................ | C08G 63/823 502/325 |
| 2023/0159699 A1* | 5/2023 | He | ........................ | C07F 11/005 528/357 |
| 2023/0167236 A1* | 6/2023 | Chen | ........................ | C08G 63/08 528/277 |
| 2023/0167237 A1* | 6/2023 | He | ........................ | C08G 63/08 528/277 |

FOREIGN PATENT DOCUMENTS

| | | | |
|---|---|---|---|
| CN | 105153203 A | * | 12/2015 |
| CN | 110433860 A | * | 11/2019 |
| CN | 111450890 A | * | 7/2020 |
| CN | 108997441 B | * | 9/2020 |

OTHER PUBLICATIONS

Jessica Chuang et al., "Solid state coordination chemistry of molybdenum oxides with 1,2,3-triazole (Htrz): The crystal structures of [Cu(I)Cu(II)2(trz)2Mo4O13(OH)], [MoO3(Htrz)0.5] and [Cu(I)trz]." Inorganica Chimica Acta 361, pp. 2357-2641. (Year: 2008).*

Xiao-Bing Cui et al., "A novel γ-octamolybdate supported transition metal complex [Cu(im)2]4[γ-Mo8O26]." Journal of Molecular Structure 743, pp. 151-155. (Year: 2005).*

Qiao Gao et al., "3D organic-inorganic hybrid framework build upon [B-Mo8O26]4-units and polymeric copper(II) complexes with magnetic properties and electrocatalytic activities for H2O2 reduction." Inorganic Chemistry Communications 104, pp. 160-164. (Year: 2019).*

Douglas Hagrman et al., "Organic-inorganic composite oxide phases: one-dimensional molybdenum oxide chains entrained within a three-dimensional coordination complex cation framework in [{Cu2(triazolate)2(H2O)2}Mo4O13]." Chemical Communications, pp. 2005-2006. (Year: 1998).*

Wen-Wen He et al., "Entangled structures in polyoxometalate-based coordination polymers." Coordination Chemistry Reviews 279, pp. 141-160. (Year: 2014).*

Kun Lu et al., "The ionothermal synthesis of a new 3-D framework based on classic β-[Mo8O26]4-anions." Journal of Coordination Chemistry, vol. 23, No. 2, pp. 255-265. (Year: 2020).*

Chung-Jing Zhang et al., "Three 3D hybrid networks based on octamolybdates and different CuI/CuII-bis(triazole) motifs." Journal of Solid State Chemistry 183, pp. 2945-2950. (Year: 2010).*

Quanguo Zhai et al., "Influence of substituents on the structures of hybrid complexes constructed from tetranuclear copper(I) 1,2,4-triazolate clusters and octamolybdates." Inorganica Chimica Acta 359, pp. 3875-3887. (Year: 2006).*

Labet M, Thielemans C. et al., Synthesis of polycaprolactone: a review, Chem. Soc. Rev., 2009, 38, 3484-3504.

Shen. et al., An unprecedented cobalt(ii)-containing Wells-Dawson-type tungstovanadate-based metal-organic framework as an efficient catalyst for ring-opening polymerization of ϵ-caprolacton, CrystEngComm 2020, 22, 3656-3663.

* cited by examiner

ISOPOLY-MOLYBDIC ACID COORDINATION POLYMER CATALYST, METHOD OF MANUFACTURING THE SAME AND APPLICATION THEREOF

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE OF RELATED APPLICATION

This application is claiming priority from Chinese patent application number 202111475222.5 filed on Dec. 3, 2021, the disclosures of which are incorporated herein by reference in their entirety.

FIELD OF THE INVENTION

The invention relates to the technical field of catalysts. In particular, it relates to an isopoly-molybdic acid coordination polymer catalyst, a method of manufacturing the same and the application thereof.

BACKGROUND OF THE INVENTION

Polycaprolactone (PCL) is a semi-crystalline aliphatic polyester high polymer with crystallinity of about 45%, a melting point of 59~64° C., and a glass transition temperature of −60° C. PCL shows good biocompatibility and biodegradability. It is a polyester polymer approved by the U.S. Food and Drug Administration for clinical use. The chain structure of PCL contains non-polar methylene and polar ester groups. These characteristics endow PCL not only with degradability but also flexibility, processibility, and mechanical properties similar to polyolefins. In the medical field, PCL can be used as bandages, orthotics, surgical sutures or the like.

PCL is usually obtained by ring-opening polymerization of caprolactone with catalysts. The most popular catalysts include aluminum alkoxy catalyst, stannous octanoate catalyst, rare earth alkoxy compound catalyst and lipase catalyst (Labet M, Thielemans C. *Chem. Soc. Rev.* 2009, 38, 3484-3504). These catalysts have high catalytic activity but are sensitive to water and air. Therefore, the polymerization must be carried out under strict conditions without water or oxygen. PCL is most often produced using low-boiling-point organic solvents such as tetrahydrofuran, dichloromethane and toluene, but these substances are difficult to use in continuous production in the polymerization industry setting, and they pose significant environmental pollution risks.

As a new type of inorganic-organic hybrid materials, organic metal coordination polymers have shown strong catalytic activity in organic transformations such as oxidation, condensation, transesterification, alkylation and polymerization because of their unsaturated metal active sites, functional organic ligands and large specific surface area. Recent studies have found that heteropoly-acidic coordination polymers (Shen., Tian F., Chang J., Huang K.-L., Zhang Z.-H., Feng X., Gu J., Chen S.-C., He M.-Y., Chen Q. *CrystEngComm* 2020, 22, 3656-3663) can catalyze the bulk ring-opening polymerization of caprolactone to produce PCL without adding alcohol initiators. However, the preparation of high molecular weight PCL by ring-opening polymerization of caprolactone catalyzed by isopoly-acidic coordination polymer has not been closely studied. The development of a polymer catalyst coordinated with polyoxometalates to synthesize PCL with a high molecular weight and narrow molecular weight distribution has great industrial potential. PCL can also be widely used as biomedical degradable polymer materials.

SUMMARY OF THE INVENTION

This section is for the purpose of summarizing some aspects of embodiments of the invention and to briefly introduce some further embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems.

Accordingly, one aspect of the present invention provides an isopoly-molybdic acid coordination polymer that eliminates the disadvantages of conventional polycaprolactone polymerization catalysts.

In one embodiment, an isopoly-molybdic acid coordination polymer catalyst is provided. The isopoly-molybdic acid coordination polymer catalyst has a chemical formula of $[Cu_2(trz)_2(\gamma\text{-}Mo_8O_{26})_{0.5}(H_2O)_2]$. The trz is a negative monovalent anion of 1,2,4-triazole, and $[\gamma\text{-}Mo_8O_{26}]$ is a γ type octamolybdate anion.

In a further embodiment of the present invention, a secondary structure unit of the isopoly-molybdic acid coordination polymer catalyst is a crystal of monoclinic crystal system; the isopoly-molybdic acid coordination polymer catalyst has a space group of $P2_1/c$, a molecular formula of $C_4H_8Cu_2Mo_4N_6O_{15}$, and a molecular weight of 891.00; the isopoly-molybdic acid coordination polymer has cell parameters of a=13.674(5)Å, b=7.811(3)Å, c=21.980(6)Å, α=90°, β=128.321(15°), γ=90° and a cell volume of 1841.8(11)Å$^3$, z=4; and a basic structure of the isopoly-molybdic acid coordination polymer catalyst is a three-dimensional network structure coordinated by copper ions, 1,2,4-triazole negative monovalent anions and molybdate[$\gamma\text{-}Mo_8O_{26}$] radicals.

Another aspect of the present invention provides a method of manufacturing an isopoly-molybdic acid coordination polymer catalyst. The method includes providing a composition, comprising copper salt, sodium molybdate dihydrate, 1,2,4-triazole and distilled water. The composition is added to a closed reactor, and the reactor is heated in an oven. The reactor is cooled to room temperature after the composition finishes undergoing the reaction. A centrifugal drying is performed to the composition to obtain a product. The product is rinsed with deionized water and ethanol, then it is dried to obtain purified isopoly-molybdic acid coordination polymer catalyst.

In a further embodiment of the present invention, the reactor is heated in an oven with a temperature ranging between 160 and 200° C. and a heating time ranging between 48 and 96 hours.

In a further embodiment of the present invention, the composition includes a copper salt being selected from copper nitrate trihydrate, copper acetate monohydrate, anhydrous copper chloride, or a combination thereof. A mass ratio between the copper salt and sodium molybdate dihydrate ranges between 1:1 and 1:3. A mass ratio between the copper salt and 1,2,4-triazole ranges between 1:1 and 1:3. A mass ratio between the sodium molybdate dihydrate and 1,2,4-triazole ranges between 1:1 and 1:2.

In a further embodiment of the present invention, the composition includes a molar amount and volume ratio between the 1,2,3-triazole and deionized water ranging between 3:10 and 3:40.

Still another aspect of the present invention provides an application of an isopoly-molybdic acid coordination polymer catalyst including mixing and heating the isopoly-molybdic acid coordination polymer catalyst and a caprolactone in a dry container.

In a further embodiment of the present invention, the mixing and heating the isopoly-molybdic acid coordination polymer catalyst and caprolactone has a heating temperature ranging between 120 and 160° C., and a heating time ranging between 1 and 8 hours.

In a further embodiment of the present invention, the mixing and heating the isopoly-molybdic acid coordination polymer catalyst and caprolactone includes a mass ratio between the isopoly-molybdic acid coordination polymer catalyst and caprolactone ranging between 1:500 and 1:10000.

In a further embodiment of the present invention, a polycaprolactone obtained by mixing and heating the isopoly-molybdic acid coordination polymer catalyst and caprolactone has a weight average molecular weight ranging between 30,000 and 60,000 and a molecular weight distribution index ranging between 1.2 and 1.5.

The present invention provides an isopoly-molybdic acid coordination polymer catalyst, method of manufacturing the same and application thereof. The isopoly-molybdic acid coordination polymer catalyst has high heat stability. The synthesis of the isopoly-molybdic acid coordination polymer catalyst is simple with high reproducibility. The copper containing isopoly-molybdic acid coordination polymer catalyst shows high catalytic activity towards caprolactone. The resulting polycaprolactone has a weight average molecular weight exceeding 50,000. For polycaprolactone, this outcome suggests a robust final product with uniform characteristics. It also suggests a great potential for low- and medium-temperature thermoplastic medical materials.

BRIEF DESCRIPTION OF THE DRAWINGS

In order to more clearly illustrate the technical solutions of the embodiments of the present invention, the drawings that are used in the description of the embodiments will be briefly introduced below. It is obvious that the drawings in the following description are only some embodiments of the present invention, and it is obvious for those skilled in the art to obtain other drawings based on these drawings without inventive exercise, in which.

DETAILED DESCRIPTION

Figure 1:
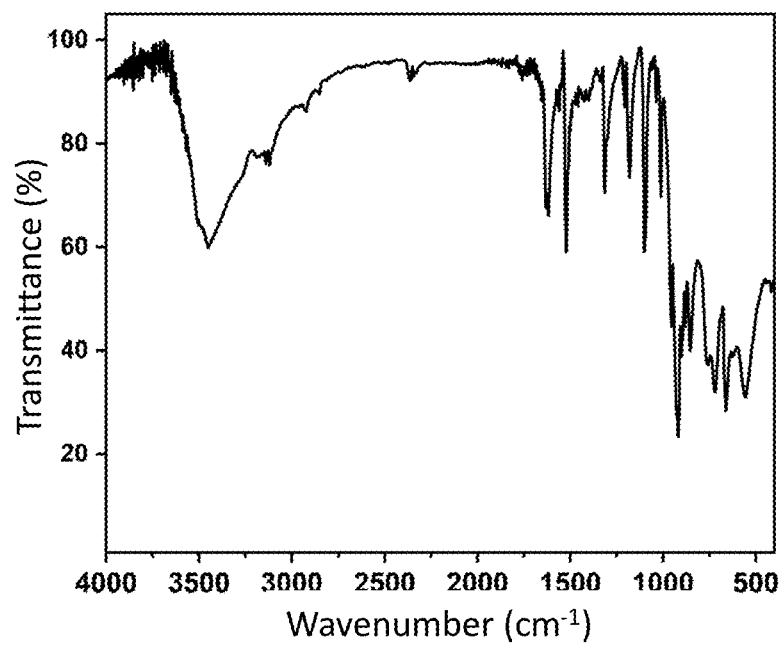
FIG. 1 is an infrared spectrum showing a copper containing isopoly-molybdic acid coordination polymer catalyst according to an embodiment of the present invention.
Figure 2:
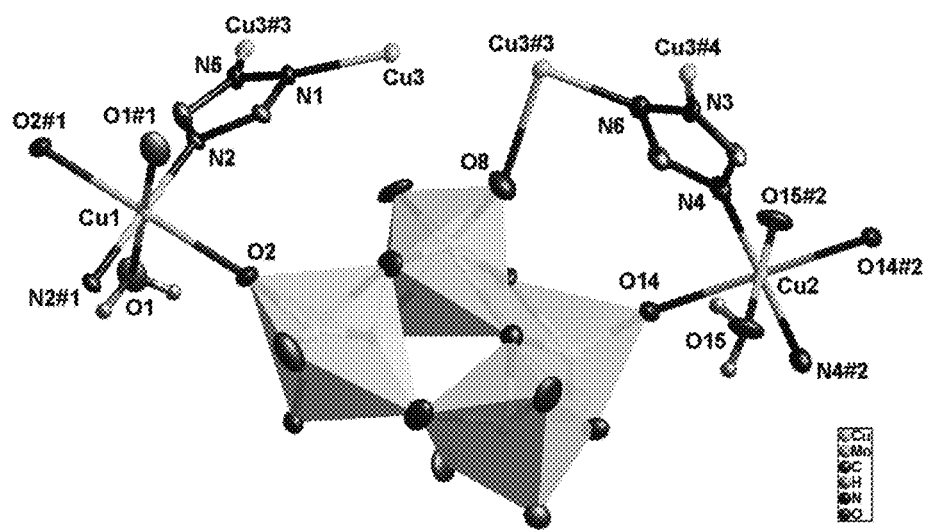
FIG. 2 shows the coordination environment of copper ions in a copper containing isopoly-molybdic acid coordination polymer catalyst according to an embodiment of the present invention.

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Furthermore, reference herein to "one embodiment" or "an embodiment" means that a particular feature, structure, or characteristic described in connection with the embodiment is included in at least one implementation of the invention. The appearances of the phrase "in one embodiment" in various places in the specification are not necessarily all referring to the same embodiment, nor are separate or alternative embodiments mutually exclusive of other embodiments.

Example 1

Manufacturing of copper containing isopoly-molybdic acid coordination polymer catalyst: Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 31.6% (42.3 mg, based on Mo).

Example 2

Copper acetate monohydrate (79.9 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 14.2% (19.0 mg, based on Mo).

Example 3

Cupric chloride anhydrous (53.8 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 20.6% (27.5 mg, based on Mo).

Example 4

Copper nitrate trihydrate (144.6 mg, 0.6 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 24.4% (32.6 mg, based on Mo).

Example 5

Copper nitrate trihydrate (48.2 mg, 0.2 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 16.9% (22.6 mg, based on Mo).

Example 6

Copper nitrate trihydrate (96.4 mg, 0.4 mmol), 1,2,4-triazole (27.6 mg, 0.4 mmol), sodium molybdate dihydrate (145.2 mg, 0.6 mmol) and deionized water (5 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 29.1% (38.9 mg, based on Mo).

Example 7

Copper nitrate trihydrate (96.4 mg, 0.4 mmol), 1,2,4-triazole (82.8 mg, 1.2 mmol), sodium molybdate dihydrate (145.2 mg, 0.6 mmol) and deionized water (5 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 28.0% (37.5 mg, based on Mo).

Example 8

Copper nitrate trihydrate (96.4 mg, 0.4 mmol), 1,2,4-triazole (41.4 mg, 0.6 mmol), sodium molybdate dihydrate (72.5 mg, 0.3 mmol) and deionized water (5 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 11.9% (15.9 mg, based on Mo).

Example 9

Copper nitrate trihydrate (96.4 mg, 0.4 mmol), 1,2,4-triazole (41.4 mg, 0.6 mmol), sodium molybdate dihydrate (96.8 mg, 0.4 mmol) and deionized water (5 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 15.8% (21.1 mg, based on Mo).

Example 10

Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 200° C. for 72 hours, it is slowly cooled to room temperature at a rate of 5° C./hour to obtain blue block crystals with a yield of 22.9% (30.6 mg, based on Mo).

Example 11

Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 160° C. for 72 hours, it is slowly cooled to room temperature at a rate of 5° C./hour to obtain blue block crystals with a yield of 16.3% (21.8 mg, based on Mo).

Example 12

Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 180° C. for 48 hours, it is slowly cooled to room temperature at a rate of 5° C./hour to obtain blue block crystals with a yield of 23.2% (31.0 mg, based on Mo).

Example 13

Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 180° C. for 96 hours, it is slowly cooled to room temperature at a rate of 5° C./hour to obtain blue block crystals with a yield of 26.4% (35.3 mg, based on Mo).

Example 14

Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 160° C. for 48 hours, it is slowly cooled to room temperature at a rate of 5° C./hour to obtain blue block crystals with a yield of 24.7% (33.0 mg, based on Mo).

Example 15

Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 200° C. for 48 hours, it is slowly cooled to room temperature at a rate of 5° C./hour to obtain blue block crystals with a yield of 19.4% (25.9 mg, based on Mo).

Example 16

Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (8 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 15.2% (20.3 mg, based on Mo).

Example 17

Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (8 ml) are added to a 15 ml polytetrafluoroethylene autoclave. After the composition undergoes a reaction at 160° C. for 72 hours, it is slowly cooled to room temperature at a rate of 5° C./hour to obtain blue block crystals with a yield of 14.3% (19.1 mg, based on Mo).

Example 18

Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (2 ml) are added to a 15 ml polytetrafluoroethylene autoclave. After the composition undergoes a reaction at 180° C. for 72 hours, it is slowly cooled to room temperature at a rate of 5° C./hour to obtain blue block crystals with a yield of 16.8% (22.4 mg, based on Mo).

Example 19

Copper nitrate trihydrate (96.4 mg, 0.4 mmol), 1,2,4-triazole (41.4 mg, 0.6 mmol), sodium molybdate dihydrate (145.2 mg, 0.6 mmol) and deionized water (2 ml) are added to a 15 ml polytetrafluoroethylene autoclave. After the composition undergoes a reaction at 200° C. for 72 hours, it is slowly cooled to room temperature at a rate of 5° C./hour to obtain blue block crystals with a yield of 21.4% (28.5 mg, based on Mo).

Example 20

Copper acetate monohydrate (79.9 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 200° C. for 72 hours, it is slowly cooled to room temperature at a rate of 5° C./hour to obtain blue block crystals with a yield of 15.3% (20.5 mg, based on Mo).

Example 21

Cupric chloride anhydrous (53.8 mg, 0.4 mmol), 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave. After the composition undergoes a reaction at 160° C. for 72 hours, it is slowly cooled to room temperature at a rate of 5° C./hour to obtain blue block crystals with a yield of 19.7% (26.4 mg, based on Mo).

Comparative Example 1

Copper nitrate is replaced with other metal salts (cobalt nitrate, iron nitrate, nickel nitrate, silver nitrate, calcium nitrate, magnesium nitrate, aluminum nitrate or lanthanum nitrate, 0.4 mmol). The other metal salts, 1,2,4-triazole (41.4 mg, 0.6 mmol), sodium molybdate dihydrate (145.2 mg, 0.6 mmol) and deionized water (5 ml) are added to a 15 ml polytetrafluoroethylene autoclave, After the composition undergoes a reaction at 180° C. for 72 hours, it is slowly cooled to room temperature at the rate of 5° C./hour. The resulting product is amorphous powders with undefined structure. No crystal sample suitable for X-ray single crystal analysis is obtained.

Comparative Example 2

Sodium molybdate dihydrate is replaced with other molybdenum salts (phosphomolybdic acid or ammonium molybdate, 0.6 mmol). The other molybdenum salts, copper nitrate (96.4 mg, 0.4 mmol), 1,2,4-triazole (41.4 mg, 0.6 mmol) and deionized water (5 ml) are added to a 15 ml polytetrafluoroethylene autoclave, After the composition undergoes a reaction at 180° C. for 72 hours, it is slowly cooled to room temperature at the rate of 5° C./hour. The resulting product is amorphous blue powders with undefined structure. No crystal sample suitable for X-ray single crystal analysis is obtained.

Comparative Example 3

1,2,4-triazole is replaced with other nitrogen heterocyclic ligands (imidazole, 2-methylimidazole, 1-methyl-1,2,4-triazole, 4-amino-1,2,4-triazole, benzimidazole, 0.6 mmol). The copper nitrate (96.4 mg, 0.4 mmol), sodium molybdate dihydrate (145.2 mg, 0.6 mmol) and deionized water (5 ml) are added to a 15 ml polytetrafluoroethylene autoclave, After the composition undergoes a reaction at 180° C. for 72 hours, it is slowly cooled to room temperature at the rate of 5° C./hour. The resulting product is amorphous blue powders with undefined structure. No crystal sample suitable for X-ray single crystal analysis is obtained.

Example 22

The yield of the blue block crystals prepared in Examples 1 to 21 is calculated. The yield is shown in Table 1. The method of calculation for the yield is as follows:

$$\text{yield} = \frac{\text{actual product weight}}{\text{theoretical yield of prodcut calculated based on molybdic acid}}$$

TABLE 1

Product weight and yield of Examples 1 to 21

| Example | Product weight (mg) | Yield (based on Mo) |
| --- | --- | --- |
| Example 1 | 43.2 | 31.6% |
| Example 2 | 19.0 | 14.2% |
| Example 3 | 27.5 | 20.6% |

TABLE 1-continued

Product weight and yield of Examples 1 to 21

| Example | Product weight (mg) | Yield (based on Mo) |
| --- | --- | --- |
| Example 4 | 32.6 | 32.6% |
| Example 5 | 22.6 | 16.9% |
| Example 6 | 38.9 | 29.1% |
| Example 7 | 37.5 | 28.0% |
| Example 8 | 15.9 | 11.9% |
| Example 9 | 21.1 | 15.8% |
| Example 10 | 30.6 | 22.9% |
| Example 11 | 21.8 | 16.3% |
| Example 12 | 31.0 | 23.2% |
| Example 13 | 35.3 | 26.4% |
| Example 14 | 25.9 | 24.7% |
| Example 15 | 25.9 | 19.4% |
| Example 16 | 20.3 | 15.2% |
| Example 17 | 19.1 | 14.3% |
| Example 18 | 22.4 | 16.8% |
| Example 19 | 28.5 | 21.4% |
| Example 20 | 20.5 | 15.3 |
| Example 21 | 26.4 | 19.7% |

As shown in Table 1, the product weight and yield of Example 1 are the highest, and the material ratio and parameters in the manufacturing steps in Example 1 are preferred.

Example 23

The blue block crystals obtained in Examples 1 to 21 are characterized by infrared detection. The instrument used is Nicolet ESP 460, and the following data are obtained. Infrared data (KBr, cm$^{-1}$) are 3448 br, 3119 w, 2360 w, 1630 s, 1617 s, 1559 w, 1522 s, 1425 w, 1314 s, 1208 m, 1179 s, 1100 s, 1037 w, 1012 m, 954 s, 917 s, 901 m, 881 m, 853 s, 720 s, 661 s, 556 s. Turning to FIG. 1 in conjunction with the infrared readouts, in each of the Examples 1 to 21, the copper containing isopoly-molybdic acid coordination polymer catalyst is produced by the synthesis method.

Example 24

Figure 3:
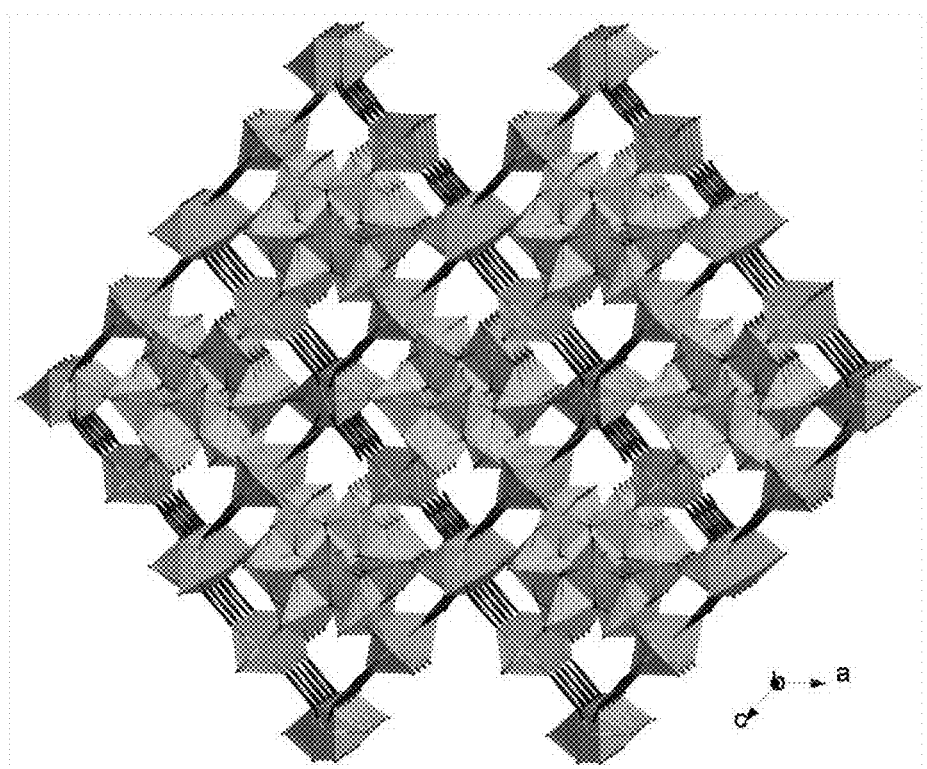
FIG. 3 is a schematic three-dimensional network structure diagram of a copper containing isopoly-molybdic acid coordination polymer catalyst according to an embodiment of the present invention.

Characterization of Example 1 Copper Containing Isopoly-Molybdic Acid Coordination Polymer Catalyst (1) Characterization of the Crystal Structure of Copper Containing Isopoly-Molybdic Acid Coordination Polymer Catalyst The crystal structure is determined by a BrukerApex-IICCD diffractometer with graphite monochromated Mo Kα ray (λ=0.71073 Å) at 293(2)K by ω scanning to collect the diffractionpoints. The collected data are restored by a SAINT program and semi empirical absorption correction is performed by SADABS method. The structure analysis and refinement are completed by SHELLXS and SHELLXL of SHELLXTL program respectively. F$^2$ is modified by a full matrix least square method to obtain the coordinates and anisotropy parameters of all non-hydrogen atoms. All hydrogen atoms are theoretically fixed to the parent atom in the process of structural refinement, and the isotropic displacement parameter is slightly larger than the parent atom displacement parameter (C—H, 1.2 or N—H, 1.2 times). Table 2 shows detailed crystal measurement data. FIG. 3 shows the three-dimensional network structure of the copper containing isopoly-molybdic acid metal.

TABLE 2

Crystallographic data of copper containing isopoly-molybdic acid coordination polymer catalyst

| | |
| --- | --- |
| Molecular formula | C$_4$H$_8$Cu$_2$Mo$_4$N$_6$O$_{15}$ |
| Molecular weight | 891.00 |
| Crystal size | 0.24 mm × 0.22 mm × 0.22 mm |
| Crystallographic system | Monoclinic |
| Space group | P2$_1$/c |
| Cell parameters | a = 13.674(5)Å |
| | b = 7.811(3)Å |
| | c = 21.980(6)Å |
| | α = 90° |
| | β = 128.321(15)° |
| | γ = 90° |
| Volume | 1841.8(11) Å$^3$ |
| Number of repeating units in cell | 4 |
| Density (calculated) | 3.213 mgm$^{-3}$ |
| Absorption coefficient | 4.999 |
| Absorption correction | Semi empirical |
| Refinement | Least square |
| F$^2$ base fit | 1.052 |
| Final R factor [I > 2s(I)] | R$_1$ = 0.0715 |
| R factor (all data) | R$_1$ = 0.0829 |
| Residual error | 0.945eÅ$^{-3}$, −1.149eÅ$^{-3}$ |

Example 25

Figure 4:
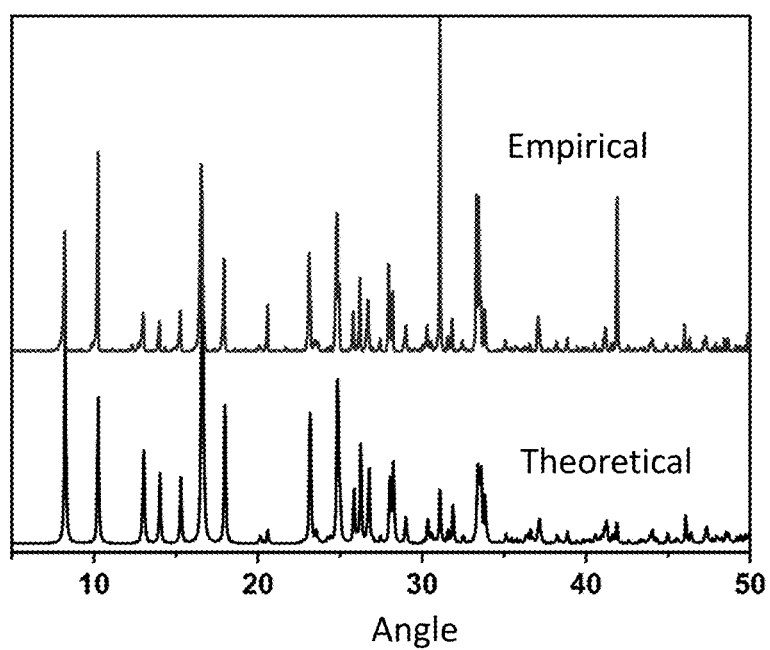
FIG. 4 is a schematic graph of powder diffraction diagram of a copper containing isopoly-molybdic acid coordination polymer catalyst according to an embodiment of the present invention.

Turning to FIG. 4, a RIGAKU d/max-2500 instrument is used to characterize the phase purity of the product manufactured in Example 1. As shown in FIG. 4, the copper containing isopoly-molybdic acid coordination polymer has a reliable phase purity, which ensures its catalytic activity in the ring-opening copolymerization of caprolactone.

Example 26

Figure 5:
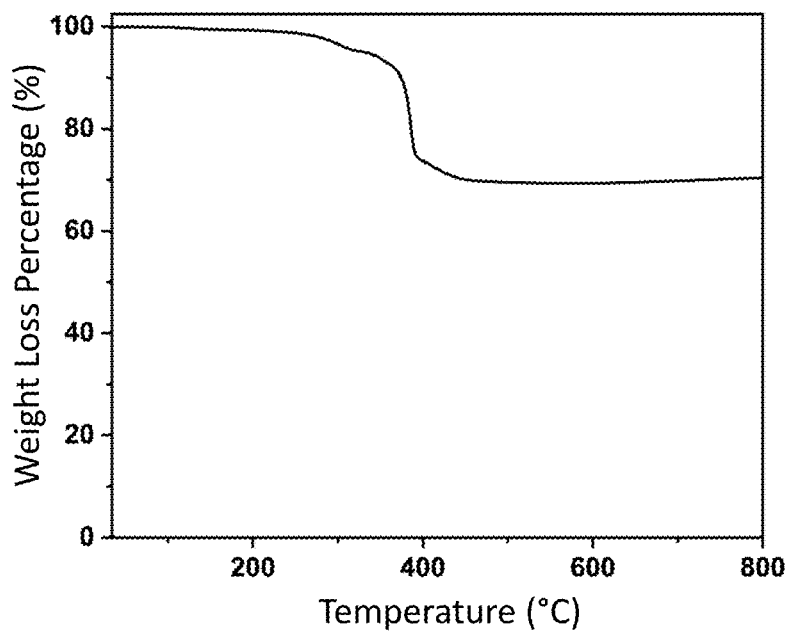
FIG. 5 is a thermogravimetric graph of a copper containing isopoly-molybdic acid coordination polymer catalyst according to an embodiment of the present invention.

The thermal stability of the copper containing isopoly-molybdic acid coordination polymer obtained in Example 1 is characterized by the thermogravimetric analyzer of NETZSCH/TG209F3. The readouts are shown in FIG. 5. Turning to FIG. 5, the copper containing isopoly-molybdic acid coordination polymer has high thermal stability even up to 320° C.

Example 27

Using the Copper Containing Isopoly-Molybdic Acid Coordination Polymer in Example 1 to Catalyze Caprolactone for the Manufacturing of PCL 5708.00 mg caprolactone (50.00 mmol) and 8.91 mg copper containing isopoly-molybdic acid coordination polymer catalyst (0.01 mmol) are added to Schlenk reaction tubes. The tubes are heated to and maintained at 150° C. for 6 hours to react. After the reaction is completed, the tubes are cooled to room temperature. The product is dissolved in 20 ml of dichloromethane. The copper containing isopoly-molybdic acid coordination polymer catalyst is recovered by centrifugation. Then, methanol is added to the filtrate to precipitate the polymer. The polymer is dried in a vacuum at 50° C. to obtain the white PCL product.

Example 28

Using the Copper Containing Isopoly-Molybdic Acid Coordination Polymer in Example 1 to Catalyze Caprolactone for the Manufacturing of PCL 570.80 mg caprolactone (5.00 mmol) and 8.91 mg copper containing isopoly-molybdic acid coordination polymer catalyst (0.01 mmol) are added to Schlenk reaction tubes. The tubes are heated to and maintained at 150° C. for 6 hours to react. After the reaction is completed, the tubes are cooled to room temperature. The product is dissolved in 20 ml of dichloromethane. The copper containing isopoly-molybdic acid coordination polymer catalyst is recovered by centrifugation. Then, methanol is added to the filtrate to precipitate the polymer. The polymer is dried in a vacuum at 50° C. to obtain the white PCL product.

Example 29

Using the Copper Containing Isopoly-Molybdic Acid Coordination Polymer in Example 1 to Catalyze Caprolactone for the Manufacturing of PCL 11416.00 mg caprolactone (100.00 mmol) and 8.91 mg copper containing isopoly-molybdic acid coordination polymer catalyst (0.01 mmol) are added to Schlenk reaction tubes. The tubes are heated to and maintained at 150° C. for 6 hours to react. After the reaction is completed, the tubes are cooled to room temperature. The product is dissolved in 20 ml of dichloromethane. The copper containing isopoly-molybdic acid coordination polymer catalyst is recovered by centrifugation. Then, methanol is added to the filtrate to precipitate the polymer. The polymer is dried in a vacuum at 50° C. to obtain the white PCL product.

Example 30

Using the Copper Containing Isopoly-Molybdic Acid Coordination Polymer in Example 1 to Catalyze Caprolactone for the Manufacturing of PCL 5708.00 mg caprolactone (50.00 mmol) and 8.91 mg copper containing isopoly-molybdic acid coordination polymer catalyst (0.01 mmol) are added to Schlenk reaction tubes. The tubes are heated to and maintained at 160° C. for 6 hours to react. After the reaction is completed, the tubes are cooled to room temperature. The product is dissolved in 20 ml of dichloromethane. The copper containing isopoly-molybdic acid coordination polymer catalyst is recovered by centrifugation. Then, methanol is added to the filtrate to precipitate the polymer. The polymer is dried in a vacuum at 50° C. to obtain the white PCL product.

Example 31

Using the Copper Containing Isopoly-Molybdic Acid Coordination Polymer in Example 1 to Catalyze Caprolactone for the Manufacturing of PCL 5708.00 mg caprolactone (50.00 mmol) and 8.91 mg copper containing isopoly-molybdic acid coordination polymer catalyst (0.01 mmol) are added to Schlenk reaction tubes. The tubes are heated to and maintained at 120° C. for 6 hours to react. After the reaction is completed, the tubes are cooled to room temperature. The product is dissolved in 20 ml of dichloromethane. The copper containing isopoly-molybdic acid coordination polymer catalyst is recovered by centrifugation. Then, methanol is added to the filtrate to precipitate the polymer. The polymer is dried in a vacuum at 50° C. to obtain the white PCL product.

Example 32

Using the Copper Containing Isopoly-Molybdic Acid Coordination Polymer in Example 1 to Catalyze Caprolactone for the Manufacturing of PCL 5708.00 mg caprolactone (50.00 mmol) and 8.91 mg copper containing isopoly-molybdic acid coordination polymer catalyst (0.01 mmol) are added to Schlenk reaction tubes. The tubes are heated to and maintained at 150° C. for 1 hours to react. After the reaction is completed, the tubes are cooled to room temperature. The product is dissolved in 20 ml of dichloromethane. The copper containing isopoly-molybdic acid coordination polymer catalyst is recovered by centrifugation. Then, methanol is added to the filtrate to precipitate the polymer. The polymer is dried in a vacuum at 50° C. to obtain the white PCL product.

Example 33

Using the Copper Containing Isopoly-Molybdic Acid Coordination Polymer in Example 1 to Catalyze Caprolactone for the Manufacturing of PCL 5708.00 mg caprolactone (50.00 mmol) and 8.91 mg copper containing isopoly-molybdic acid coordination polymer catalyst (0.01 mmol) are added to Schlenk reaction tubes. The tubes are heated to and maintained at 150° C. for 8 hours to react. After the reaction is completed, the tubes are cooled to room temperature. The product is dissolved in 20 ml of dichloromethane. The copper containing isopoly-molybdic acid coordination polymer catalyst is recovered by centrifugation. Then, methanol is added to the filtrate to precipitate the polymer. The polymer is dried in a vacuum at 50° C. to obtain the white PCL product.

Example 34

Figure 6:
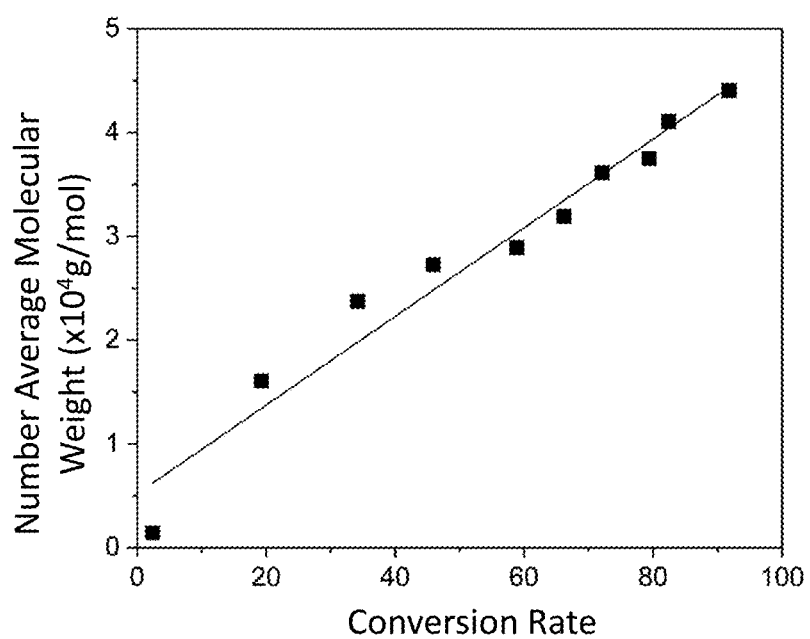
FIG. 6 is a graph showing a relationship between the conversion rate of the ring-opening polymerization of ε-caprolactone by the copper containing isopoly-molybdic acid coordination polymer catalyst according to an embodiment of the present invention and the molecular weight of PCL.

The PCL obtained in Example 26 through the catalysis of the copper containing isopoly-molybdic acid coordination polymer undergoes $^1$H NMR quantitative analysis (instrument model: Bruker AVANCE 400 MHz). The data are shown in FIG. 6. As shown in FIG. 6, when the molecular weight is larger, the conversion rate of the resulting PCL is higher.

Comparative Example 4

5708.00 mg caprolactone (50.00 mmol) and 2.41 mg copper nitrate trihydrate (0.01 mmol) are added to Schlenk reaction tubes. The tubes are heated to and maintained at 150° C. for 6 hours to react. The $^1$H NMR quantitative analysis results show that the conversion rate of caprolactone is 50.2%. 7.0 mg of PPDO is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 11,394, and the molecular weight distribution index is approximately 1.85.

Comparative Example 5

5708.00 mg caprolactone (50.00 mmol) and 0.69 mg 1,2,4-triazole (0.01 mmol) are added to Schlenk reaction tubes. The tubes are heated to and maintained at 150° C. for 6 hours to react. The $^1$H NMR quantitative analysis results show that the conversion rate of caprolactone by the catalysis of 1,2,4-triazole is very low. The monomer conversion rate is 6%. is 50.2%. The calculated weight average molecular weight is approximately 780, and the molecular weight distribution index is approximately 1.12.

Comparative Example 6

5708.00 mg caprolactone (50.00 mmol) and 2.42 mg sodium molybdate dihydrate (0.01 mmol) are added to Schlenk reaction tubes. The tubes are heated to and maintained at 150° C. for 6 hours to react. The $^1$H NMR quantitative analysis results show that caprolactone does not converse, and there is no PCL product.

Example 35

The molecular weight of the PCL products obtained in Examples 27-33 are measured.

Method of measurement: 7.0 mg of PCL is taken and dissolved in 1 ml of tetrahydrofuran solution. The solution is filtered through a 0.4 μm pore size polytetrafluoroethylene filter membrane. 20 μl of the filtrate is taken and added to an LC-20ADGPC sampler produced by Shimadzu (Japan). The data are calculated and recorded in Table 2. Test conditions: The column temperature is 40° C. The eluent is tetrahydrofuran. The flow rate is 0.6 ml/min. The detector is a RID-10A detector. Calibration: four different standardized polystyrene having molecular weight ranging between 8,000, 20,000, 50,000 and 100,000 are used.

TABLE 3

Molecular weight and molecular weight distribution index of the PCL obtained in Examples 27-33

| Example | Molecular weight | Molecular weight distribution index |
|---|---|---|
| Example 26 | 55294 | 1.27 |
| Example 27 | 50415 | 1.39 |
| Example 28 | 38597 | 1.32 |
| Example 29 | 41503 | 1.44 |
| Example 30 | 52310 | 1.48 |
| Example 31 | 37796 | 1.29 |
| Example 32 | 42681 | 1.46 |

According to Table 3, the PCL obtained in Example 27 has a higher molecular weight, and the molecular weight distribution of the PCL is more even. In other words, the quality of the same batch is more stable.

Comparing the results in Table 3 and the data from the Comparative Examples 4 to 6, when certain steps in Example 27 are omitted, the resulting products have very poor qualities that can hardly be made into a solid matter.

According to the results shown in Table 3 and Example 34, when the copper containing isopoly-molybdic acid coordination polymer obtained in Example 1 is used as a catalyst to manufacture PCL, as shown in Example 27, the resulting product has preferable properties.

It should be noted that the above-mentioned embodiments are only for illustrating the technical solutions of the present invention and not for limiting, and although the present invention has been described in detail with reference to the further embodiments, it should be understood by those skilled in the art that modifications or equivalent substitutions may be made on the technical solutions of the present invention without departing from the spirit and scope of the technical solutions of the present invention, which should be covered by the claims of the present invention.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all ranges disclosed in the present disclosure include endpoints. The term "substantially coplanar" may refer to two surfaces within a few micrometers (m) positioned along the same plane, for example, within 10 m, within 5 m, within 1 m, or within 0.5 m located along the same plane. When reference is made to "substantially" the same numerical value or characteristic, the term may refer to a value within ±10%, ±5%, ±1%, or ±0.5% of the average of the values.

The invention claimed is:

1. An isopoly-molybdic acid coordination polymer catalyst, having a chemical formula of $[Cu_2(trz)_2(\gamma-Mo_8O_{26})_{0.5}(H_2O)_2]$, wherein trz is a negative monovalent anion of 1,2,4-triazole, and $[\gamma-Mo_8O_{26}]$ is a γ type octamolybdate anion.

2. The isopoly-molybdic acid coordination polymer catalyst of claim 1, wherein a secondary structure unit of the isopoly-molybdic acid coordination polymer catalyst is a crystal of monoclinic crystal system, the isopoly-molybdic acid coordination polymer catalyst has a space group of $P2_1/c$, a molecular formula of $C_4H_8Cu_2Mo_4N_6O_{15}$, and a molecular weight of 891.00, the isopoly-molybdic acid coordination polymer has cell parameters of a=13.674(5)Å, b=7.811(3)Å, c=21.980(6)Å, α=90°, β=128.321(15°), γ=90°, cell volume of 1841.8(11)Å$^3$, z=4, and a basic structure of the isopoly-molybdic acid coordination polymer catalyst is a three-dimensional network structure coordinated by copper ions, 1,2,4-triazole negative monovalent anions and molybdate$[\gamma-Mo_8O_{26}]$ radicals.

3. A method of manufacturing an isopoly-molybdic acid coordination polymer catalyst comprising:
   providing a composition, comprising copper salt, sodium molybdate dihydrate, 1,2,4-triazole and distilled water;
   adding the composition to a closed reactor and heating the reactor in an oven;
   cooling the reactor to a room temperature after a reaction being completed in the reactor;
   performing centrifugal drying to the composition to obtain a product;
   rinsing the product with deionized water and ethanol; and
   drying the product to obtain purified isopoly-molybdic acid coordination polymer catalyst.

4. The method of claim 3, wherein the heating the reactor in the oven has an oven temperature ranging between 160 and 200° C. and a heating time ranging between 48 and 96 hours.

5. The method of claim 3, wherein the providing the composition includes a copper salt being selected from the group consisting of copper nitrate trihydrate, copper acetate monohydrate, anhydrous copper chloride, or a combination thereof, a mass ratio between the copper salt and sodium molybdate dihydrate ranges between 1:1 and 1:3, a mass ratio between the copper salt and 1,2,4-triazole ranges between 1:1 and 1:3, and a mass ratio between the sodium molybdate dihydrate and 1,2,4-triazole ranges between 1:1 and 1:2.

6. The method of claim 3, wherein the providing the composition includes a molar amount and volume ratio between the 1,2,3-triazole and deionized water ranging between 3:10 and 3:40.

7. An application of an isopoly-molybdic acid coordination polymer catalyst comprising:

mixing and heating the isopoly-molybdic acid coordination polymer catalyst and a caprolactone in a dry container.

8. The application of claim 7, wherein the mixing and heating the isopoly-molybdic acid coordination polymer catalyst and caprolactone has a heating temperature ranging between 120 and 160° C., and a heating time ranging between 1 and 8 hours.

9. The application of claim 7, wherein the mixing and heating the isopoly-molybdic acid coordination polymer catalyst and caprolactone includes a mass ratio between the isopoly-molybdic acid coordination polymer catalyst and caprolactone ranging between 1:500 and 1:10000.

10. The application of claim 7, wherein a polycaprolactone obtained by mixing and heating the isopoly-molybdic acid coordination polymer catalyst and caprolactone has a weight average molecular weight ranging between 30,000 and 60,000 and a molecular weight distribution index ranging between 1.2 and 1.5.

* * * * *